No. 750,343. Patented January 26, 1904.

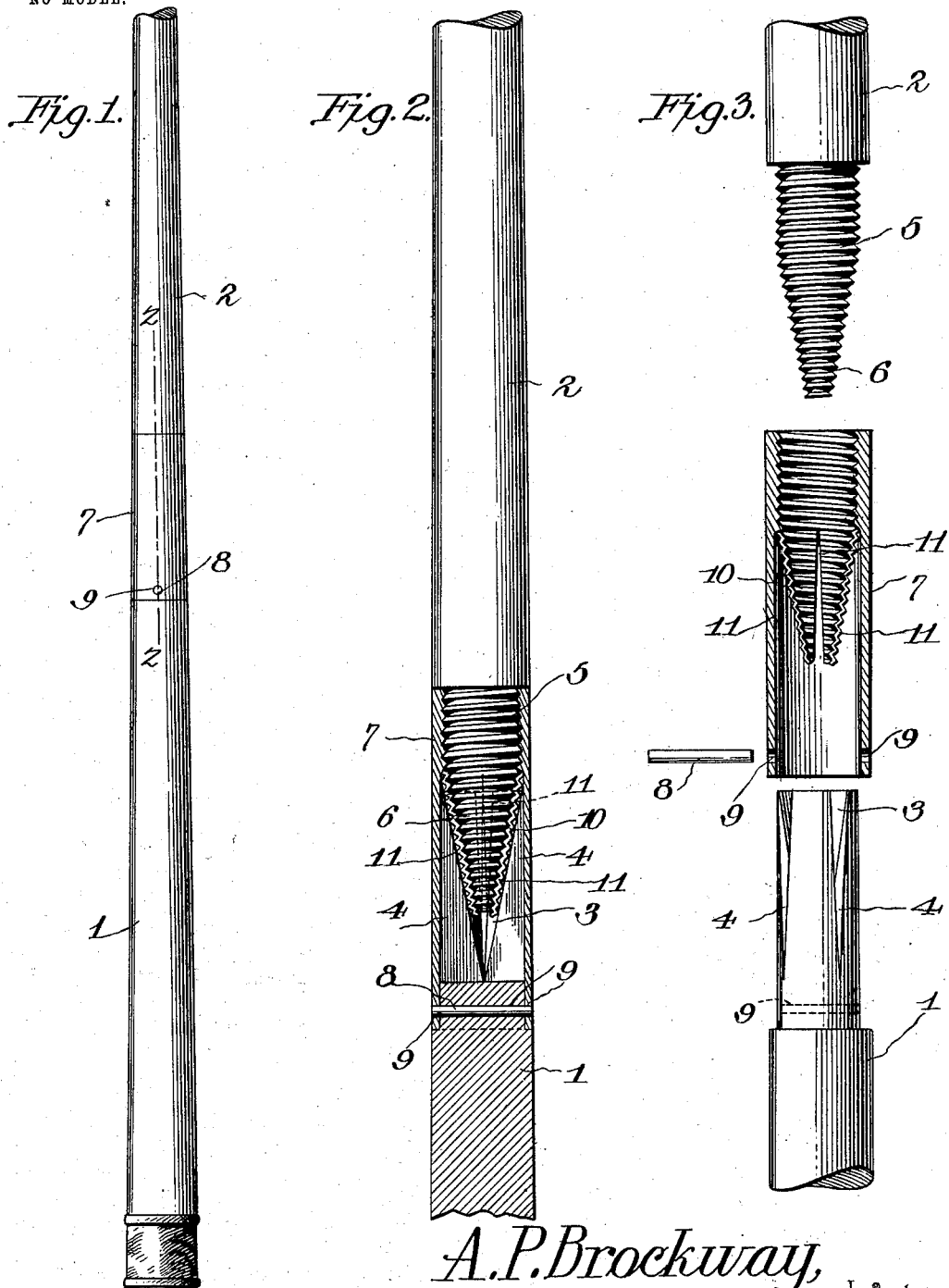

UNITED STATES PATENT OFFICE.

ALBERT P. BROCKWAY, OF TAMPA, FLORIDA.

JOINT-COUPLING.

SPECIFICATION forming part of Letters Patent No. 750,343, dated January 26, 1904.

Application filed July 20, 1903. Serial No. 166,398. (No model.)

*To all whom it may concern:*

Be it known that I, ALBERT PIERCE BROCKWAY, a citizen of the United States, residing at the city of Tampa, in the county of Hillsboro, State of Florida, have invented a new and useful Improvement Consisting of a Joint-Coupling, of which the following is a specification.

My invention relates to an improved joint-coupling designed especially for connecting the sections of carriage-whips, fishing-rods, and the like, and has for its objects to produce a device of this character of comparatively simple construction by which the parts or sections are firmly and detachably connected and looseness and rattling wholly obviated.

To these ends the invention comprises the novel details of construction and combination of parts more fully hereinafter described.

In the accompanying drawings, Figure 1 is a side elevation illustrating one embodiment of my invention, showing the parts assembled. Fig. 2 is a central longitudinal section on the line 2 2 of Fig. 1. Fig. 3 is a view similar to Fig. 2, showing the parts detached.

Referring to the drawings, in which the device is illustrated as applied for connecting the sections of a carriage-whip, 1 designates the handle portion or primary section of the whip, and 2 the lash portion or secondary section. The primary section 1 is provided at one end with a longitudinally-disposed conical socket 3, the walls of which are divided at diametrically opposite points by longitudinally-extending V-shaped slots or incisions 4, whereby transverse expansion and contraction of the socket for diametrically expanding or contracting the end of the section 1 is permitted, for the purpose which will hereinafter appear. The sections 1 and 2 are in practice arranged end to end in longitudinal alinement, and the end of section 2, which meets the socketed end of section 3, is provided with an expander member 5, preferably in the form of an externally-threaded reduced portion or extension formed integral with the end of the section and having a conical portion 6 conforming to but of slightly greater diameter than socket 3.

7 designates a tubular connecting sleeve or member designed to receive the ends of sections 1 and 2 and to be fixed to the former and against rotation by a pin or other suitable fastening device 8, engaging an opening 9. The end of sleeve 7, which receives section 1, is smooth upon its interior, while the opposite end, which receives extension or expander 5, is internally screw-threaded and merges into a conical expanding member 10, disposed centrally of and preferably formed integral with the sleeve. The walls of the expanding member 10 are divided by V-shaped slots or incisions 11, disposed longitudinally of and extending inward from the apex of the member, whereby the member, which is slighly greater in diameter than the socket 3, is susceptible of expansion and contraction.

In practice the sleeve 7 is fixed upon the end of section 1 in the manner above described and as shown more clearly in Fig. 2, at which time the expanding member 10 will lie within the socket 3. The expander 5 is then screwed into the opposite end of sleeve 7, when the conical portion 6 will spread or expand 10 and in turn expand socket 3, thus tightly binding or clamping the walls of the socket between the inner wall of sleeve 7 and the outer wall of the expanding member 10, whereby a tight non-rattling, but readily detachable, connection is made between the sections.

From the foregoing it will be seen that I produce a device of simple construction which is admirably adapted for the attainment of the ends in view; but it is to be understood that I do not limit or confine myself to the precise details herein set forth, inasmuch as minor changes may be made therein without departing from the spirit or scope of the invention.

Having thus described my invention, what I claim is—

1. In a device of the class described, the combination with a primary section provided with an end socket having outwardly-diverging walls, the walls of the socket being incised longitudinally of a sleeve receiving the end of said section and having an expanding member seated in the socket, a secondary section, and an expander carried thereby for spreading the expanding member.

2. In a device of the class described, the combination with a primary section provided with a conical end socket having its walls incised longitudinally, of a sleeve embracing and fixed upon the end of said section and carrying a conical expanding member seated in the socket, said member being slotted longitudinally, a secondary section, and an expander provided thereon for spreading the expanding member.

3. In a device of the class described, the combination with a primary section provided with a conical end socket having its walls incised longitudinally, of a sleeve embracing and fixed upon the end of said section and carrying a conical expanding member seated in the socket, said member being slotted longitudinally, a secondary section, and an expander carried by the section and having a threaded portion engaging the sleeve and a conical portion seated in and spreading the expanding member.

In testimony whereof I hereto sign my name to this specification in the presence of two subscribing witnesses.

ALBERT P. BROCKWAY.

Witnesses:
ROBERT B. McGECKIN,
J. R. SHARP.